(12) United States Patent
Zhang et al.

(10) Patent No.: US 11,378,501 B2
(45) Date of Patent: Jul. 5, 2022

(54) ROTARY FATIGUE TESTER WITH COMPLEX LOADS

(71) Applicant: Southwest Petroleum University, Sichuan (CN)

(72) Inventors: Zhi Zhang, Sichuan (CN); Yuanjin Zhao, Sichuan (CN); Duo Hou, Sichuan (CN); Nan Cai, Sichuan (CN); Xiankang Zhong, Sichuan (CN); Pengfei Sang, Sichuan (CN); Jian Ding, Sichuan (CN); Jinming Liu, Sichuan (CN); Jiawei Wang, Sichuan (CN)

(73) Assignee: Southwest Petroleum University, Sichuan (CN)

( * ) Notice: Subject to any disclaimer, the term of this patent is extended or adjusted under 35 U.S.C. 154(b) by 202 days.

(21) Appl. No.: 16/828,981

(22) Filed: Mar. 25, 2020

(65) Prior Publication Data
US 2020/0225135 A1 Jul. 16, 2020

(30) Foreign Application Priority Data
Nov. 28, 2019 (CN) .......................... 201911190998.5

(51) Int. Cl.
*G01N 3/38* (2006.01)
*G01N 17/00* (2006.01)

(52) U.S. Cl.
CPC ............. *G01N 3/38* (2013.01); *G01N 17/002* (2013.01)

(58) Field of Classification Search
CPC .... G01N 3/32; G01N 3/38; G01N 2203/0005; G01N 2203/0019; G01N 2203/0025; G01N 2203/0026; G01N 2203/0073; G01N 2203/024; G01N 2203/0242
See application file for complete search history.

(56) References Cited

U.S. PATENT DOCUMENTS

| | | | |
|---|---|---|---|
| 8,491,308 B2* | 7/2013 | Iwasaki .................... | G01N 3/32 434/272 |
| 2021/0356371 A1* | 11/2021 | Kim ......................... | G01N 3/56 |

FOREIGN PATENT DOCUMENTS

CN 107290229 * 10/2017 ............... G01N 3/20

OTHER PUBLICATIONS

Machine translation of CN 107290229 (Year: 2017).*

* cited by examiner

*Primary Examiner* — Natalie Huls

(57) ABSTRACT

A rotary fatigue tester with complex loads includes a pump, a first motor, a second motor, a circulatory loop, an experimental kettle body, and a holding device. The experimental kettle body is a cylindrical tank, the circulatory loop is located on the experimental kettle body, a pump is located within the circulatory loop and is connected with a corrosive gas pipeline; the holding device is located within the experimental kettle body for fixing a test piece, a force-bearing pole is located at one side of the experimental kettle body for applying a shear force to the test piece, the holding device and the force-bearing pole are connected with the first motor and the second motor respectively. The rotary fatigue tester is able to simultaneously apply the axial alternating load and tangential alternating load to the test piece, for simulating the force of the test piece under complex loads.

1 Claim, 1 Drawing Sheet

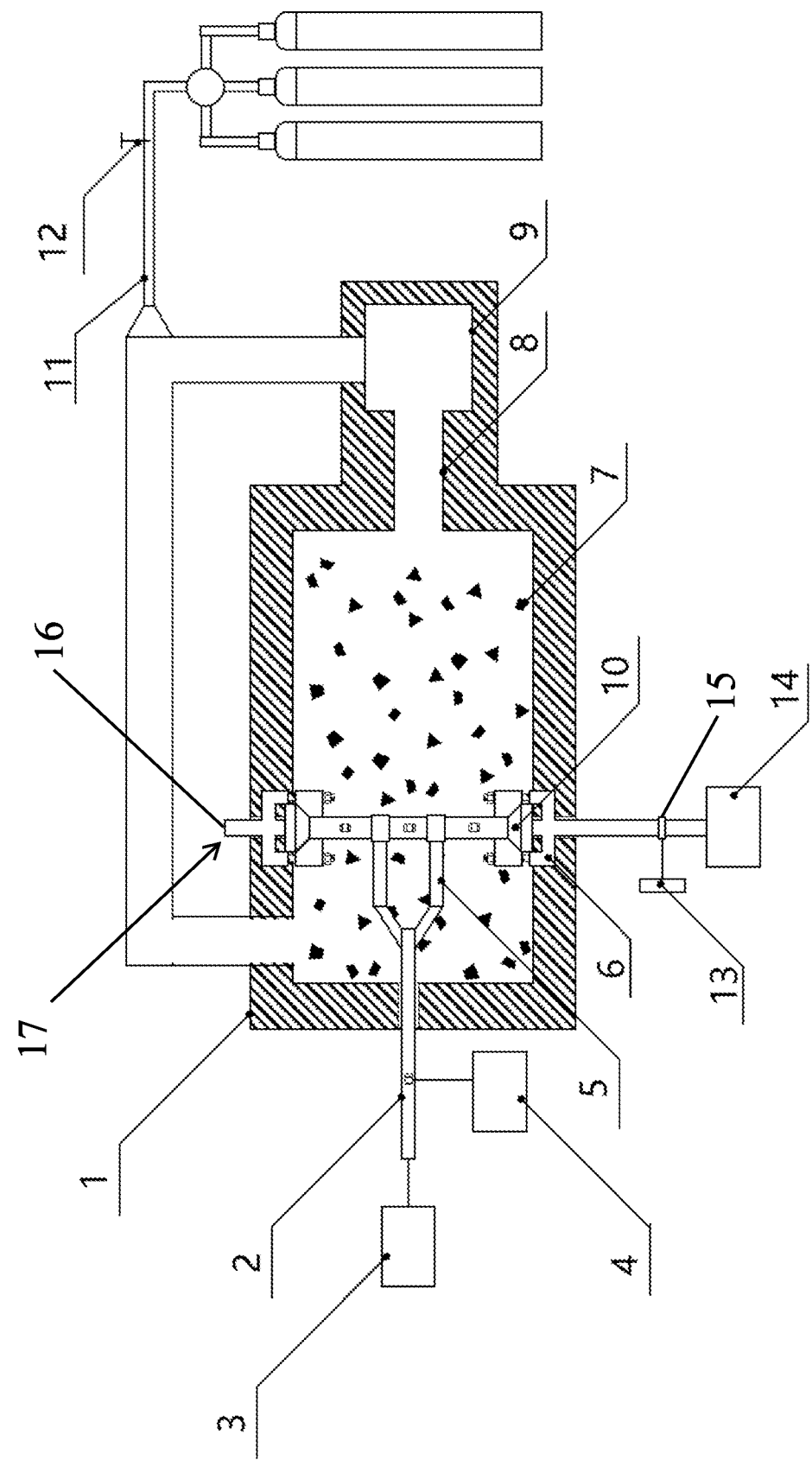

ROTARY FATIGUE TESTER WITH COMPLEX LOADS

CROSS REFERENCE OF RELATED APPLICATION

The present invention claims priority under 35 U.S.C. 119(a-d) to CN 201911190998.5, filed Nov. 28, 2019.

BACKGROUND OF THE PRESENT INVENTION

Field of Invention

The present invention relates to a rotary fatigue tester with complex loads, which belongs to the field of rotary fatigue testing technology.

Description of Related Arts

The existing rotary fatigue testers can only apply a tangential force to a test piece, so their functions are limited.

SUMMARY OF THE PRESENT INVENTION

Aiming at the above technical problem, the present invention provides a rotary fatigue tester with complex loads.

To achieve the above object, the present invention provides a technical solution as follows.

A rotary fatigue tester with complex loads comprises a pump, a first motor, a second motor, a circulatory loop, an experimental kettle body, and a holding device, wherein:

the experimental kettle body is a cylindrical tank, the circulatory loop is located on the experimental kettle body, the pump is located within the circulatory loop and connected with a corrosive gas pipeline;

the holding device is located within the experimental kettle body for fixing a test piece, a force-bearing pole is located at one side of the experimental kettle body for applying a shear force to the test piece, the holding device and the force-bearing pole are to connected with the first motor and the second motor respectively.

Preferably, the holding device comprises an upper holding part and a lower holding part, wherein the lower holding part is dynamically sealed with the experimental kettle body and is driven to rotate by the first motor, the lower holding part applies an alternating axial force measured by a first load sensor to the test piece, an axial strain of the test piece is measured by a first displacement sensor; the force-bearing pole is connected with the second motor, a magnitude a direction of the shear force are controlled by the second motor, the magnitude of the shear force is measured by a second load sensor, a transverse strain of the test piece caused by the shear force is measured by a second displacement sensor.

Beneficial effects of the present invention are as follows.

(1) The existing rotary fatigue testers only can apply the tangential force to the test piece, and however, the rotary fatigue tester provided by the present invention can simultaneously apply the axial alternating load and tangential alternating load to the rotary test piece, for simulating the force of the test piece under complex loads.

(2) In addition to corrosive gases and liquids within the experimental kettle body of the rotary fatigue tester provided by the present invention, solid phase particles with a certain concentration are added to simulate the erosive environment.

BRIEF DESCRIPTION OF THE DRAWINGS

The drawing is a structurally schematic view of a rotary fatigue tester with complex loads provided by the present invention.

DETAILED DESCRIPTION OF THE PREFERRED EMBODIMENT

The present invention will be further described in detail below with the accompanying drawing and embodiment as follows.

Referring to the drawing, a rotary fatigue tester with complex loads according to a preferred embodiment of the present invention is illustrated, which comprises a pump 9, a first motor 14, a second motor 3, a circulatory loop 8, an experimental kettle body 1, and a holding device 17, wherein:

the experimental kettle body 1 is a cylindrical tank, the circulatory loop 8 is located on the experimental kettle body 1, a pump 9 is located within the circulatory loop 8 and connected with a corrosive gas pipeline 11, a valve 12 is located on the corrosive gas pipeline 11;

the holding device 17 comprising an upper holding part 16 and a lower holding part 6 is located within the experimental kettle body 1 for fixing a test piece 10, wherein the lower holding part 6 is dynamically sealed with the experimental kettle body 1 and is driven to rotate by the first motor 14, the first motor 14 is able to apply an alternating axial force to the test piece 10 by applying tension and compression to the lower holding part 6, the alternating axial force is measured by a first load sensor 15, an axial strain of the test piece 10 is measured by a first displacement sensor 13, a force-bearing pole 5 is located at one side of the experimental kettle body 1 for applying a shear force to the test piece 10 and is connected with the second motor 3, the magnitude and direction of the shear force are controlled by the second motor 3, the magnitude of the shear force is measured by a second load sensor 2, a transverse strain of the test piece 10 caused by the shear force is measured by a second displacement sensor 4, the holding device 17 and the force-bearing pole 5 are connected with the first motor 14 and the second motor 3 respectively.

The rotary fatigue tester with complex loads is also able to simulate the rotary fatigue test of the test piece under the action of alternating axial load and alternating tangential force in a high temperature and high pressure corrosive erosive environment. The corrosive gas is fed into the circulatory loop 8 via the corrosive gas pipeline 11, so as to the pump 9 circulates the fluid carrying a certain concentration of solid phase particles 7 in the experimental kettle body 1 to form the high temperature and high pressure corrosive erosive environment.

What is claimed is:

1. A rotary fatigue tester with complex loads, which comprises a pump (9), a first motor (14), a second motor (3), a circulatory loop (8), an experimental kettle body (1), and a holding device (17), wherein:

the experimental kettle body (1) is a cylindrical tank, the circulatory loop (8) is located on the experimental kettle body (1), the pump (9) is located within the circulatory loop (8) and connected with a corrosive gas pipeline (11);

the holding device (17) is located within the experimental kettle body (1) for fixing a test piece (10), a force-bearing pole (5) is located at one side of the experimental kettle body (1) for applying a shear force to the test piece (10), the holding device (17) and the force-bearing pole (5) are connected with the first motor (14) and the second motor (3) respectively;

the holding device (17) comprises an upper holding part (16) and a lower holding part (6) which is dynamically sealed with the experimental kettle body (1) and is driven to rotate by the first motor (14), the lower holding part (6) applies an alternating axial force to the test piece (10), the alternating axial force is measured by a first load sensor (15), an axial strain of the test piece (10) is measured by a first displacement sensor (13); the force-bearing pole (5) is connected with the second motor (3), a magnitude and a direction of the shear force are controlled by the second motor (3), the magnitude of the shear force is measured by a second load sensor (2), a transverse strain of the test piece (10) caused by the shear force is measured by a second displacement sensor (4).

\* \* \* \* \*